(12) United States Patent
Tokach et al.

(10) Patent No.: US 9,010,364 B2
(45) Date of Patent: Apr. 21, 2015

(54) COMBINATION RELIEF VALVE AND INJECTION FITTING

(75) Inventors: Thomas J. Tokach, Mandan, ND (US); William C. Shelbourn, Bismarck, ND (US); Scott N. Schuh, Fort Ransom, ND (US)

(73) Assignee: Clark Equipment Company, West Fargo, ND (US)

( * ) Notice: Subject to any disclaimer, the term of this patent is extended or adjusted under 35 U.S.C. 154(b) by 954 days.

(21) Appl. No.: 11/835,437

(22) Filed: Aug. 8, 2007

(65) Prior Publication Data

US 2009/0038693 A1 Feb. 12, 2009

(51) Int. Cl.
  *F16K 15/04* (2006.01)
  *F16K 24/00* (2006.01)

(52) U.S. Cl.
  CPC ............. *F16K 15/044* (2013.01); *F16K 24/00* (2013.01)

(58) Field of Classification Search
  CPC .............................. F16K 15/044; F16K 24/00
  USPC ........... 137/512, 601.2, 601.21, 537.3, 513.3, 137/513.7, 599.01, 599.11, 881, 879, 880, 137/886, 535, 539, 540
  See application file for complete search history.

(56) References Cited

U.S. PATENT DOCUMENTS

| | | | |
|---|---|---|---|
| 2,006,141 A * | 6/1935 | Hussey | 137/314 |
| 2,483,544 A | 10/1949 | Jacobsen | |
| 2,729,228 A | 1/1956 | Stevenson | |
| 2,771,093 A | 11/1956 | Wilson | |
| 2,892,614 A | 6/1959 | Majneri | |
| 3,050,080 A | 8/1962 | Pagano | |
| 3,512,754 A | 5/1970 | Zaino | |
| 3,605,808 A * | 9/1971 | Fisher | 137/599.18 |
| 3,896,845 A * | 7/1975 | Parker | 137/493.3 |
| 3,967,635 A * | 7/1976 | Sealfon et al. | 137/102 |

(Continued)

FOREIGN PATENT DOCUMENTS

| | | |
|---|---|---|
| DE | 9213539 | 3/1993 |
| EP | 0218409 A2 | 4/1987 |

OTHER PUBLICATIONS

Search Report and Written Opinion dated Dec. 4, 2008 for International application No. PCT/US2008/009486.

(Continued)

*Primary Examiner* — William McCalister
(74) *Attorney, Agent, or Firm* — John D. Veldhuis-Kroeze; Westman, Champlin & Koehler, P.A.

(57) ABSTRACT

A valve for regulating the flow of fluid through an access port in a fluid chamber includes a body having a first end and a second end, the second end being located in the access port and the first end protruding outside of the access port. An axial bore extends from the first end to the second end, an injection fitting is formed at the first end of the body in fluid communication with the axial bore, and the second end of the body includes a selective sealing interface. The body forms a sealing interface with a threaded inner wall surface of the access port. A one-way valve assembly is positioned within the axial bore, and is arranged to permit a flow of fluid therethrough in a downstream direction and prevent the flow of fluid therethrough in an upstream direction. A bypass passageway extends from the selective sealing interface separate from the axial bore. A connecting passageway connects the bypass passageway with the axial bore upstream of the one-way valve assembly.

15 Claims, 3 Drawing Sheets

(56) References Cited

U.S. PATENT DOCUMENTS

| | | | |
|---|---|---|---|
| 4,512,441 A | | 4/1985 | Cooper |
| 4,692,102 A | * | 9/1987 | Hafele et al. ............... 417/296 |
| 4,804,017 A | | 2/1989 | Knapp |
| 4,869,292 A | | 9/1989 | Sulwer |
| 4,893,650 A | | 1/1990 | Chisholm et al. |
| 4,926,902 A | * | 5/1990 | Nakamura et al. ......... 137/493.3 |
| 4,969,697 A | * | 11/1990 | Lindenman ............... 303/113.5 |
| 4,979,541 A | | 12/1990 | Holland |
| 4,989,639 A | | 2/1991 | Sulwer |
| 5,029,604 A | * | 7/1991 | Spektor et al. ............... 137/226 |
| 5,311,901 A | * | 5/1994 | Ostrom ...................... 137/493.3 |
| 5,950,669 A | * | 9/1999 | Fehlmann et al. ......... 137/493.3 |
| 6,079,519 A | | 6/2000 | Lotttes |
| 6,607,007 B1 | * | 8/2003 | Hull et al. ..................... 137/613 |
| 7,134,641 B2 | | 11/2006 | Jensen et al. |
| 7,331,323 B2 | * | 2/2008 | Hara ........................ 123/196 A |

OTHER PUBLICATIONS

Communication dated Jun. 1, 2012 in Chinese application No. 200880102409.7, filed Aug. 7, 2008, with English translation attached, 9 pages.

Office Action from the Chinese Patent Office dated Jul. 6, 2011 for Chinese application No. 200880102409.7, filed Aug. 7, 2008.

Communication dated Mar. 1, 2012 in European application No. 08 795 110.9, filed Aug. 7, 2008, 6 pages.

* cited by examiner

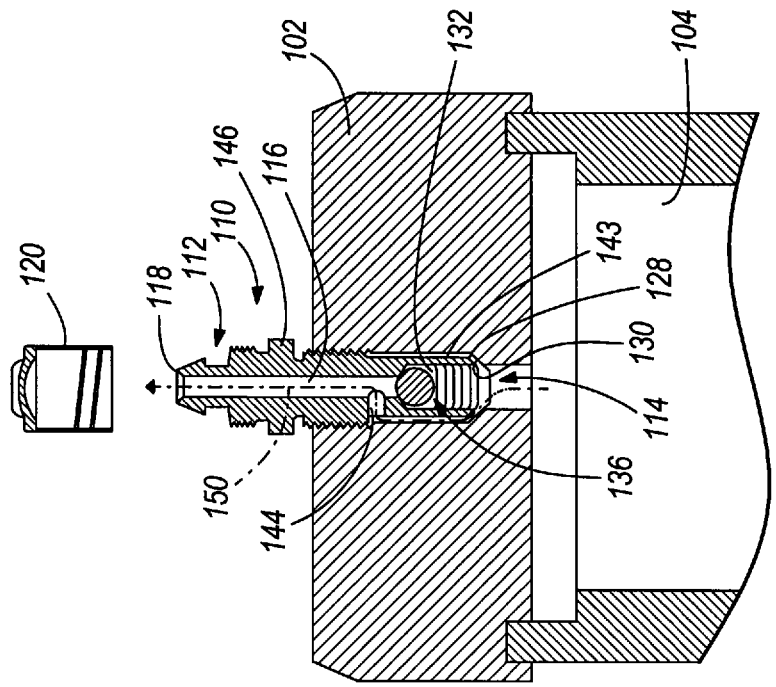
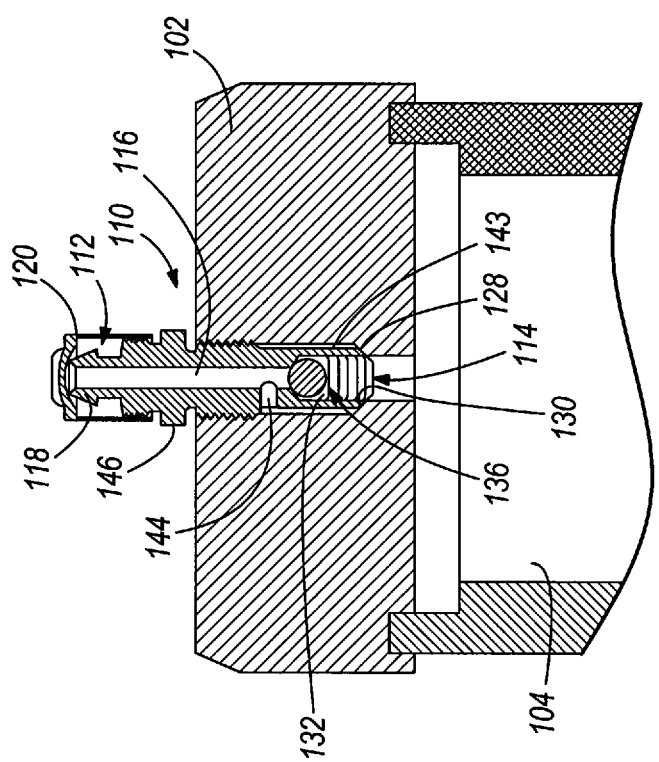
FIG. 4
FIG. 3

COMBINATION RELIEF VALVE AND INJECTION FITTING

FIELD OF THE INVENTION

The present invention relates to an apparatus and method for controlling the flow of fluid into and out of a pressurized fluid chamber.

SUMMARY

In one embodiment, the invention provides a bleed valve and injection fitting adapted for use in an access port of a fluid chamber. The bleed valve and injection fitting includes a body having a first end, a second end, downstream of the first end, a first sealing interface on an outer surface of the body adapted to form a seal with an inner surface of the access port and a second sealing interface at the second end of the body adapted to selectively seal to the inner surface of the access port. A first passageway extends through the body from the first end to the second end. An injection fitting is formed at the first end of the body in fluid communication with the first passageway. A one-way valve assembly is positioned within the first passageway, the one-way valve assembly being arranged to permit a flow of fluid therethrough in a downstream direction and prevent the flow of fluid therethrough in an upstream direction. A second passageway extends from the second sealing surface separate from the first passageway and a connecting passageway connects the second passageway with the first passageway upstream of the one-way valve assembly.

In another embodiment, the invention provides a bleed valve and injection fitting adapted for use in an access port of a fluid chamber. The bleed valve and injection fitting includes a body having a first end and a second end, the first end being formed with a injection fitting and the second end including a sealing surface selectively sealable to an inner surface of the access port. The bleed valve and injection fitting includes a bi-directional passageway extending through the body from the first end part of the way towards the second end, a one-way passageway extending from the bi-directional passageway to the second end and a bypass passageway separate from the one-way passageway, the bypass passageway extending from the sealing surface to the bi-directional passageway.

In another embodiment, the invention provides a fluid chamber for holding a pressurized fluid. The fluid chamber includes a chamber defining an inner cavity and having an access port for accessing the inner cavity, the access port having a first surface and a second surface, and a valve for regulating the flow of fluid through the access port. The valve includes a body having a first end, a second end, downstream of the first end, a sealing interface between the body and the first surface and a selective sealing interface between the body and the second surface. A first passageway extends through the body from the first end to the body. An injection fitting is formed at the first end of the body in fluid communication with the first passageway. A one-way valve assembly is positioned within the first passageway, the one-way valve assembly being arranged to permit a flow of fluid therethrough in a downstream direction and prevent the flow of fluid therethrough in an upstream direction. A second passageway extends from the selective sealing interface separate from the first passageway and a connecting passageway connects the second passageway with the first passageway upstream of the one-way valve assembly.

Other aspects of the invention will become apparent by consideration of the detailed description and accompanying drawings.

BRIEF DESCRIPTION OF THE DRAWINGS

FIG. 3 shows a cross-sectional view of the bleed valve of FIG. 2 in a closed state.

FIG. 4 shows a cross-sectional view of the bleed valve and FIG. 3 in an open state.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
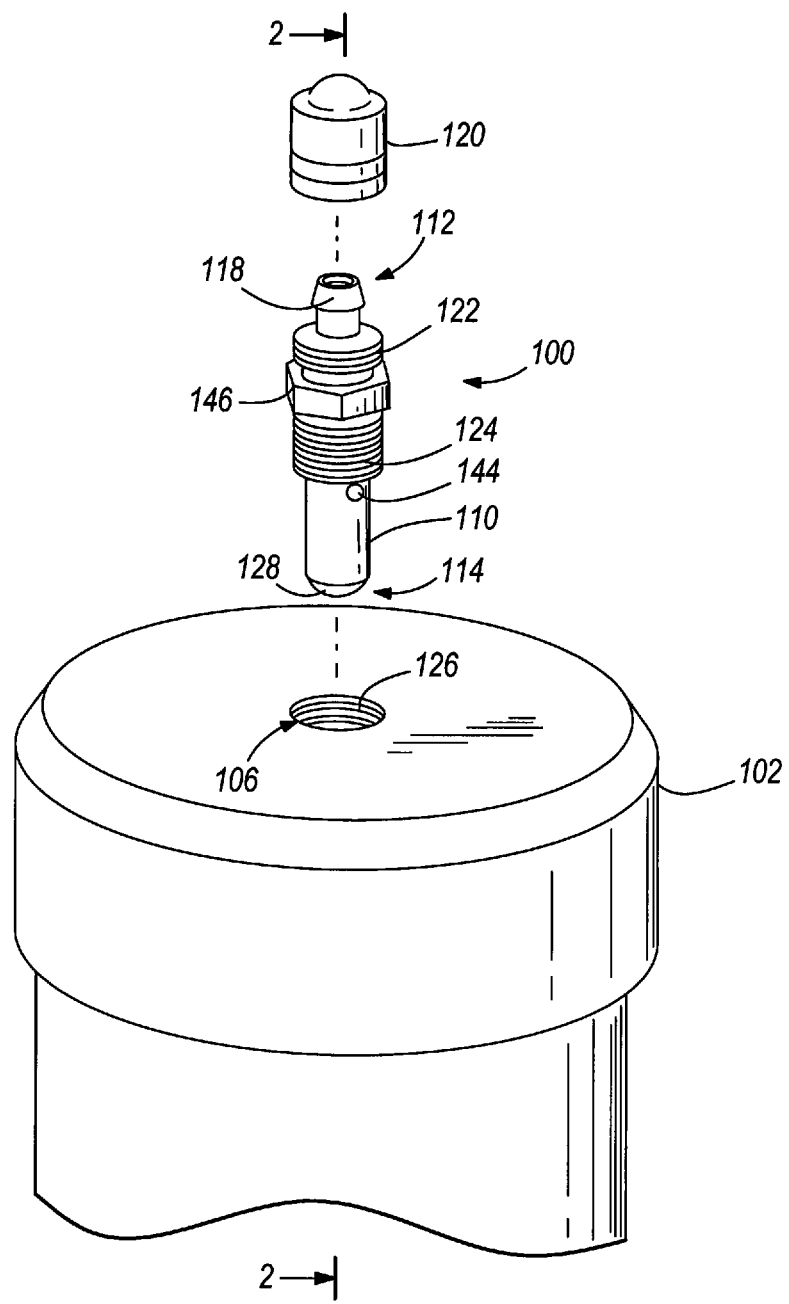
FIG. 1 shows an exploded view of a bleed valve in relation to a fluid chamber according to an embodiment of the invention.
Figure 2:
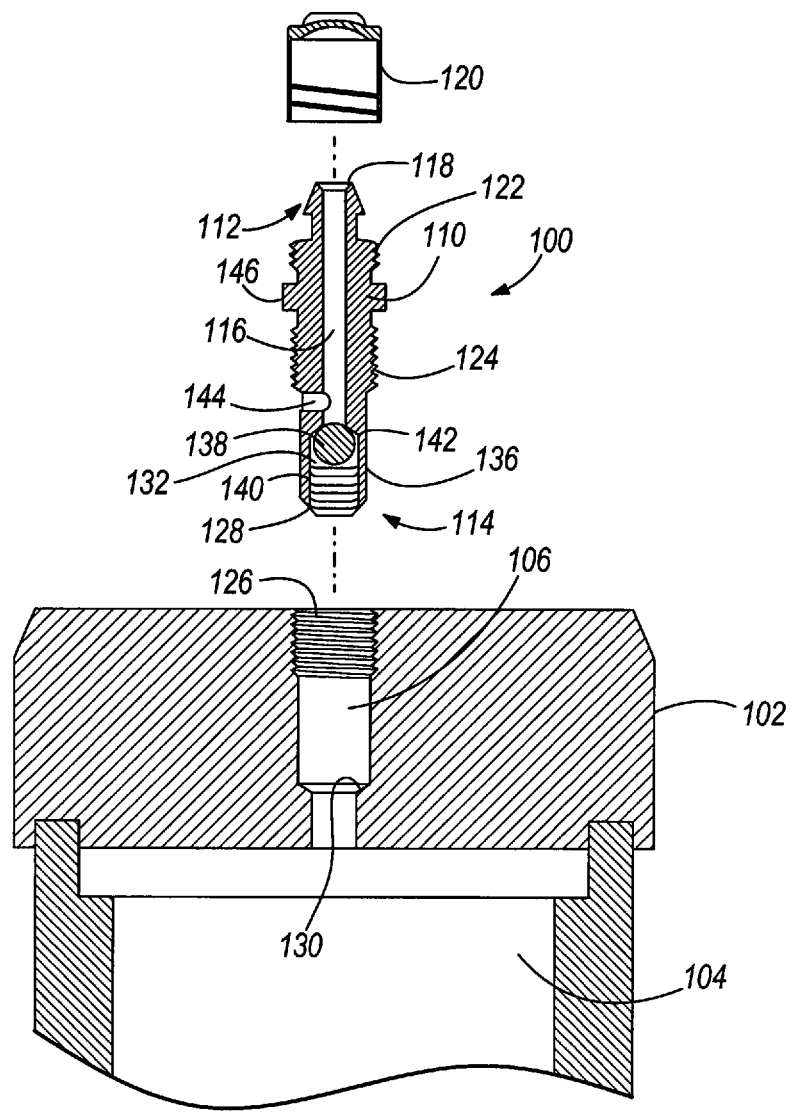
FIG. 2 shows a cross-sectional view of the bleed valve and fluid chamber of FIG. 1 taken along line 2-2.

FIGS. 1 and 2 illustrate a relief or bleed valve and injection fitting (hereinafter "the bleed valve") 100 according to an embodiment of the invention. The bleed valve 100 is shown in relation to a fluid chamber 102. The fluid chamber 102 includes a cavity 104 for holding fluids such as grease under pressures exceeding the ambient pressure outside of the fluid chamber 102. The bleed valve 100 is installed in an access port 106 in the fluid chamber 102 to regulate the pressure of fluid within the cavity 104 by permitting the introduction of pressurized fluid into the cavity 104 and also by releasing fluid from the cavity 104.

The bleed valve 100 includes a body 110 having a first end 112, a second end 114 and a first passageway 116. The first end 112 of the body 110 is formed with an injection fitting 118 that is in fluid communication with the first passageway 116. The injection fitting 118 permits the bleed valve 100 to be connected with a source of pressurized fluid, such as a grease pump adaptor. A dust cap 120 is detachably coupled to the first end 112 of the body 110 for covering and protecting the injection fitting 118 when not in use. Dust cap threads 122 are provided on the body 110 for securing the dust cap 120 to the body 110. Other structures can be provided for removably coupling the dust cap 120 to the body 110. For example, the body 110 and/or the dust cap 120 can include ramped surfaces for sliding the dust cap 120 onto the body 110 axially.

The body 110 includes a first sealing interface 124 adapted for forming a seal with an inner surface 126 of the access port 106. In the illustrated embodiment, the first sealing interface 124 includes threads adapted for threadedly engaging complementary threads on the inner surface 126 of the access port 106. The first sealing interface 124 secures the body 110 within the access port 106 and also forms a seal with the access port 106, such that when the first sealing interface 124 is threaded onto the inner surface 126 of the access port 106, a seal is formed between the body 110 and the inner surface 126.

The second end 114 of the body includes a second or selective sealing interface 128 adapted for forming a seal with an inner surface 130 of the access port 106. In the illustrated embodiment, the selective sealing interface 128 includes an upwardly tapered surface at the second end 114 of the body 110. The selective sealing interface 128 abuts the inner surface 130 of the access port 106 as the body 110 travels axially into the access port 106. When the body 110 is fully seated in the access port 106, as shown in FIG. 3, the selective sealing interface 128 forms a seal between the body 110 and the inner surface 130 of the access port 106. When the body 110 is slightly backed out of the access port 106, i.e., is not fully seated within the access port 106, the selective sealing interface 128 is spaced apart from the inner surface 130 does not form a seal.

In the illustrated embodiment, the first passageway 116 is an axial bore extending through the body 110. Fluid can flow bi-directionally through the first passageway 116 into and out of the fluid chamber 102. Upstream and downstream are taken in reference to the flow of fluid into the fluid chamber 102 through the bleed valve 100. Therefore, by upstream, it is meant closer to the first end 112 of the body 110. Likewise, by downstream, it is meant closer to the second end 114 of the body 110.

The body 110 includes a second or one-way passageway 132 downstream of the first passageway 116. In the illustrated embodiment, the one-way passageway 132 is an axial bore extending from the first passageway 116 to the second end 114 of the body 110. The one-way passageway 132 includes a one-way valve assembly 136. The valve assembly 136 has an open state that permits fluid to flow through the valve assembly 136 in a downstream direction and a closed state which does not permit the flow of fluid. In one embodiment, the valve assembly 136 includes a check ball 138 and a biasing member 140 biasing the check ball 138 into sealing engagement with a shoulder 142. The biasing member 140 is located downstream of the check ball 138 and is loaded in between the check ball 138 and an inner surface of the body 110. The biasing member 140 can be compressed or loaded to permit the check ball 138 to move away from the shoulder 142.

The body 110 includes a third or bypass passageway 143. The bypass passageway 143 is separate from the one-way passageway 132 and is in fluid communication with the selective sealing interface 128. In the illustrated embodiment, the bypass passageway 143 is a circumferential gap between the outer surface of the body 110 and the inner surface of the access port 106. A portion of the body 110 has a reduced outer diameter to form the bypass passageway 143. In other embodiments, the access port 106 has an increased inner diameter to form the bypass passageway 143. In still other embodiments, the bypass passageway 143 is groove or recess in the outer surface of the body 110 or is a bore in the body 110.

The body 110 further includes a connecting passageway 144 connecting the bypass passageway 143 with the first passageway 116. In the illustrated embodiment, the connecting passageway 144 is a bore in the body 110 extending from the outer surface of the body 110 adjacent the bypass passageway 143 to the first passageway 116. The connecting passageway 144 can be a radial bore. The connecting passageway 144 is therefore in fluid communication with the bypass passageway 143 and with the first passageway 116 upstream of the valve assembly 136.

To implement the bleed valve 100 for regulating the flow of fluid into and out of the fluid chamber 102, and thus the pressure of the fluid within the fluid chamber 102, the bleed valve 100 is installed on the access port 106. The second end 114 of the body 110 is inserted into the access port 106 and the body 110 is threaded into the access port 106 over the first sealing interface 124. The body 110 can include a nut portion 146 having truncated or flattened sides to facilitate rotating the body 110. The body 110 is rotated in a first direction, for example, clockwise, to advance the body 110 axially into the access port 106. When the body 110 is fully seated in the access port 106, as shown in FIG. 3, the threaded engagement at the first sealing interface 124 forms a seal between the bleed valve 100 and the fluid chamber 102.

Axial travel of the body 110 into the access port 106 is limited by the second sealing interface 128 abutting the inner surface 130 of the access port. As the body 110 is fully seated in the access port 106, the second sealing interface 128 is tightly pressed against the inner surface 130 of the access port 106, forming a seal between the bleed valve 100 and the fluid chamber 102. With the selective sealing interface 128 sealed to the access port 106, the valve 100, as illustrated in FIG. 3, is in a closed state.

Fluid is prevented from escaping the cavity 104 through the bleed valve 100 when the bleed valve 100 is in the closed state by operation of the valve assembly 136. Pressurized fluid is able to enter the one-way passageway 132 through the second end 114 of the body 110. The pressurized fluid forces the check ball 138 into sealing engagement with the shoulder 142, thereby inhibiting fluid flow into the first passageway 116. The biasing member 140 exerts a biasing force on the check ball 138 as well, forcing the check ball 138 into sealing engagement with the shoulder 143. The valve assembly 136 is thus also in a closed state. The bypass passageway 143 is sealed from the fluid in the cavity 104 by the selective sealing interface 128.

To add fluid to the fluid chamber, the dust cap 120 is removed and a source of fluid is coupled to the bleed valve 100 by installing an adaptor over the injection fitting 118. Fluid is injected into the cavity 104 along a first or fluid injection pathway. The fluid travels along the first passageway 116 in a downstream direction. If the injected fluid pressure is sufficient, the injected fluid pushes the check ball 138 downstream, away from the shoulder 142. The valve assembly 136 (as opposed to the bleed valve 100) is thus in an open state, permitting the introduction of the injected fluid into the cavity 104 through the one-way passageway 132. When the flow of injected fluid is stopped, the biasing member 140 and the force of the pressurized fluid within the cavity 104 force the check ball 138 upstream into engagement with the shoulder 142, so that the valve assembly 136 is once again in a closed state, thereby preventing fluid leakage or escape. The adaptor is removed from the injection fitting 118 and the dust cap 120 is reattached to the body 110.

The bleed valve 100 is also operable to facilitate the controlled release of fluid from the cavity 104 to relieve fluid pressure within the cavity 104. Fluid is released from the cavity 104 along a second or fluid relief pathway. To release fluid from the fluid chamber 102, the dust cap 120 is removed to expose the first passageway 116 to the ambient pressure outside of the fluid chamber 102. A wrench or other tool is used to rotate the body 110 relative to the fluid chamber 102 in a second direction, for example, counter-clockwise. As the body 110 rotates, the body 110 travels axially over the threads in an upstream direction, away from the fluid chamber 102.

This causes the selective sealing interface 128 to become spaced apart from the sealing surface 130, un-sealing the selective sealing interface 128 from the sealing surface 130. In one embodiment, a quarter turn of the body 110 is sufficient to break the seal at the selective sealing interface 128. The bleed valve 100 (as opposed to the valve assembly 136) is now in an open or fluid release state.

FIG. 4 shows the bleed valve 100 in the open state. With the bleed valve 100 in the open state, the bypass passageway 143 is exposed to the pressurized fluid in the cavity 104. The elevated pressure within the cavity 104 relative to the ambient pressure drives the flow of fluid in an upstream direction. The pressurized fluid flows past the selective sealing interface 128 and enters the bypass passageway 143. As the first sealing interface 124 remains sealed to the access port inner surface 126, fluid flows from the bypass passageway 143 into the connecting passageway 144. From the connecting passageway 144, the pressurized fluid flows into the first passageway 116, as indicated by dashed arrow 150 and in an upstream direction through the first end 112 of the body 110.

The first passageway 116 at the first end 112 of the body 110 provides a controlled location for fluid release through the bleed valve 100. Furthermore, a reservoir can be attached to injection fitting 118 or positioned below injection fitting 118 to collect the released fluid, reducing the inconvenience and mess associated with releasing fluids from pressurized fluid chambers.

The bleed valve 100 also permits a controlled release of fluid pressure from the fluid chamber 102. As the body 110 is rotated, fluid gradually seeps around the tapered second end 114 and flows into the second fluid pathway. This can reduce high-pressure ejection of fluid from the fluid chamber 102.

To return the bleed valve 136 to the closed state, the body 110 is rotated relative to the fluid chamber 102 in the first direction (i.e., clockwise) to re-seat the selective sealing interface 128 against the sealing surface 130. This re-seals the bypass passageway 143 from the cavity 104. As before, the valve assembly 136 prevents the flow of pressurized fluid out of the fluid chamber 102. The dust cap 120 is reinstalled on the first end 112 of the body 110.

Thus, the invention provides, among other things, a bleed valve and injection fitting. Various features and advantages of the invention are set forth in the following claims.

What is claimed is:

1. A combination of a fitting and a fluid chamber for introducing pressurized fluid into the fluid chamber through an introduction path that extends in a downstream direction and relieving pressurized fluid from the fluid chamber through a relief path that extends in an upstream direction, wherein:
   the fitting has a body extending from a first end to a second end, downstream of the first end, and further comprises:
   an injection fitting being integrally formed at the first end, the injection fitting being configured to be connected to a source of pressurized fluid;
   a first sealing interface on an outer surface of the body having threads;
   a second sealing interface at the second end of the body;
   a first passageway extending axially through the injection fitting on the first end and a portion of the body;
   a second passageway extending through a portion of the body from the first passageway to the second end with a one-way valve assembly positioned within the second passageway, the one-way valve assembly being arranged to permit a flow of fluid from the first passageway through the second passageway in the downstream direction toward the second end of the body and prevent the flow of fluid from the second passageway to the first passageway in the upstream direction away from the second end of the body;
   the fluid chamber comprises:
   a cavity for holding pressurized fluid; and
   an access port for allowing the introduction and relief of pressurized fluid into the cavity, the fitting being positioned in the access port, the access port including:
   a first inner surface having threads such that engagement of the threads on the first inner surface of the access port with the threads on the first sealing interface forms a seal; and
   a second inner surface configured to engage the second sealing interface and form a seal with the second sealing interface when the body is fully seated in the access port, wherein the second sealing interface is held rigidly engaged with the second inner surface when the body is fully seated in the access port by threaded engagement between the first sealing interface of the fitting and the first inner surface of the access port; and
   the introduction path extends through the first passageway and the second passageway and the relief path extends through a bypass passageway and the first passageway, the bypass passageway being defined by a portion of the first inner surface of the access port and the body of the fitting from the second sealing interface so that the relief path bypasses the second passageway, wherein access to the relief path from the fluid chamber is blocked at the second sealing interface when the fitting is fully seated in the access port and accessible only when the fitting is not fully seated in the access port.

2. The combination of claim 1, wherein the one-way valve assembly includes a check ball movable to permit the flow of fluid from the first passageway to the second passageway, and a biasing member for biasing the check ball to prevent the flow of fluid from the second passageway to the first passageway.

3. The combination of claim 2, further comprising a shoulder in the body for cooperating with the check ball.

4. The combination of claim 1, wherein the body of the fitting is movable between a fully seated state and a non-fully seated state by moving the body axially relative to the fluid chamber.

5. The combination of claim 4, wherein the body of the fitting is movable between the fully seated state and the non-fully seated state by rotating the body relative to the fluid chamber.

6. The combination of claim 1, wherein the first passageway is an axial bore in the body.

7. An apparatus in combination with a fluid chamber, the apparatus being inserted into an access port of the fluid chamber, wherein:
   the apparatus comprises:
   a body having a first end and a second end, the body having an injection fitting integrally formed into the first end and a tapered sealing surface formed at the second end, the tapered sealing surface being engaged with an inner surface of the access port when the body is fully seated in the access port, the body further including:
   a bi-directional passageway extending through the body from the first end part of the way towards the second end;
   a one-way passageway extending from the bi-directional passageway to the second end; and
   a bypass passageway, separate from the one-way passageway;

a check ball and biasing member located in the one-way passageway; and the bi-directional passageway and the one-way passageway form a fluid injection pathway from the first end of the body into the fluid chamber, and wherein the bypass passageway and the bi-directional passageway form a portion of a fluid relief pathway that bypasses the one-way passageway, the fluid relief pathway also including a portion defined by a portion of an outer surface of the body and a surface defining a portion of the access port of the fluid chamber, the fluid relief pathway being blocked when the body is inserted in a first position in the access port and opened when the body is inserted in a second position in the access port, wherein the tapered sealing surface is held rigidly engaged with the inner surface of the access port, when the body is fully seated in the access port, by threaded engagement between the body and the access port.

8. The combination of claim 7, wherein the bi-directional passageway includes an axial bore in the body.

9. The combination of claim 7, wherein the bypass passageway is at least partially defined by the outer surface of the body.

10. The combination of claim 7, wherein the body is a single, continuous body extending from the first end to the second end, and wherein the bypass passageway includes a radial bore in the single, continuous body.

11. The combination of claim 7, wherein when the body is inserted in the first position, the sealing surface is sealed to the inner surface of the access port and when the body is inserted in the second position the sealing surface is un-sealed.

12. The combination of claim 1, wherein the body is formed from one unitary piece of material extending between the first end and the second end.

13. The combination of claim 9, wherein the bypass passageway is at least partially defined by the access port.

14. The combination of claim 1, wherein the body of the fitting is a single, continuous body extending from the first end to the second end.

15. The combination of claim 14, wherein the single, continuous body of the fitting is configured such that the fitting is movable between a fully seated state in which the second sealing interface at the second end of the body blocks access to the relief path from the fluid chamber and a non-fully seated state which allows access to the relief path from the fluid chamber by rotating the single, continuous body to move the body axially relative to the fluid chamber.

* * * * *